United States Patent [19]
von Hoevel et al.

[11] 3,748,850
[45] July 31, 1973

[54] EXHAUST SYSTEM FOR A DIESEL ENGINE

[75] Inventors: Edmund H. von Hoevel; Robert A. Bolte, both of Jeannette, Pa.

[73] Assignee: Hanlon & Wilson Company, Jeannette, Pa.

[22] Filed: Oct. 18, 1971

[21] Appl. No.: 189,948

[52] U.S. Cl. .................................. 60/13, 60/323
[51] Int. Cl. ........................................ F02b 37/04
[58] Field of Search ............................. 60/13, 323

[56] References Cited
UNITED STATES PATENTS

| 3,618,313 | 11/1971 | Zehnder | 60/13 |
| 3,077,071 | 2/1963 | Leichtfuss | 60/323 |
| 2,730,861 | 1/1956 | Büchi | 60/13 |
| 2,899,797 | 8/1959 | Birmenn | 60/13 |
| 3,064,417 | 11/1962 | Tryhorn | 60/13 |
| 3,614,259 | 10/1971 | Neff | 60/13 |

FOREIGN PATENTS OR APPLICATIONS

| 1,451,908 | 2/1970 | Germany | 60/13 |

*Primary Examiner*—Carlton R. Croyle
*Assistant Examiner*—Warren Olsen
*Attorney*—John M. Webb

[57] ABSTRACT

An exhaust system for a high-performance diesel engine in which at least one of the engine cylinders exhausts directly into a turbocharger associated with the engine and the balance of the engine cylinders exhaust into regions of lower pressure in a main pipe in communication with the turbocharger. The system provides the best features of a constant velocity and a constant pressure system.

8 Claims, 10 Drawing Figures

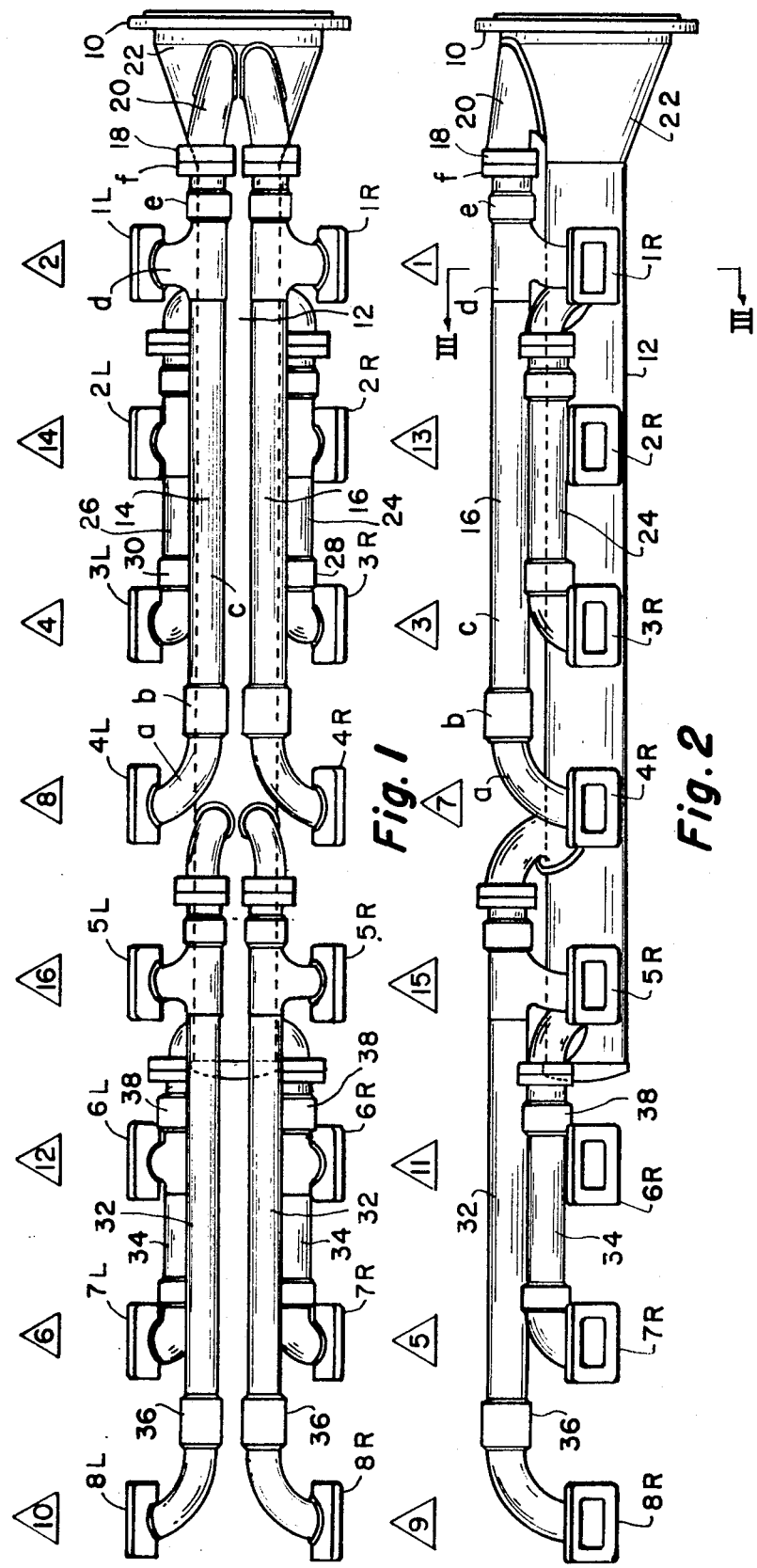

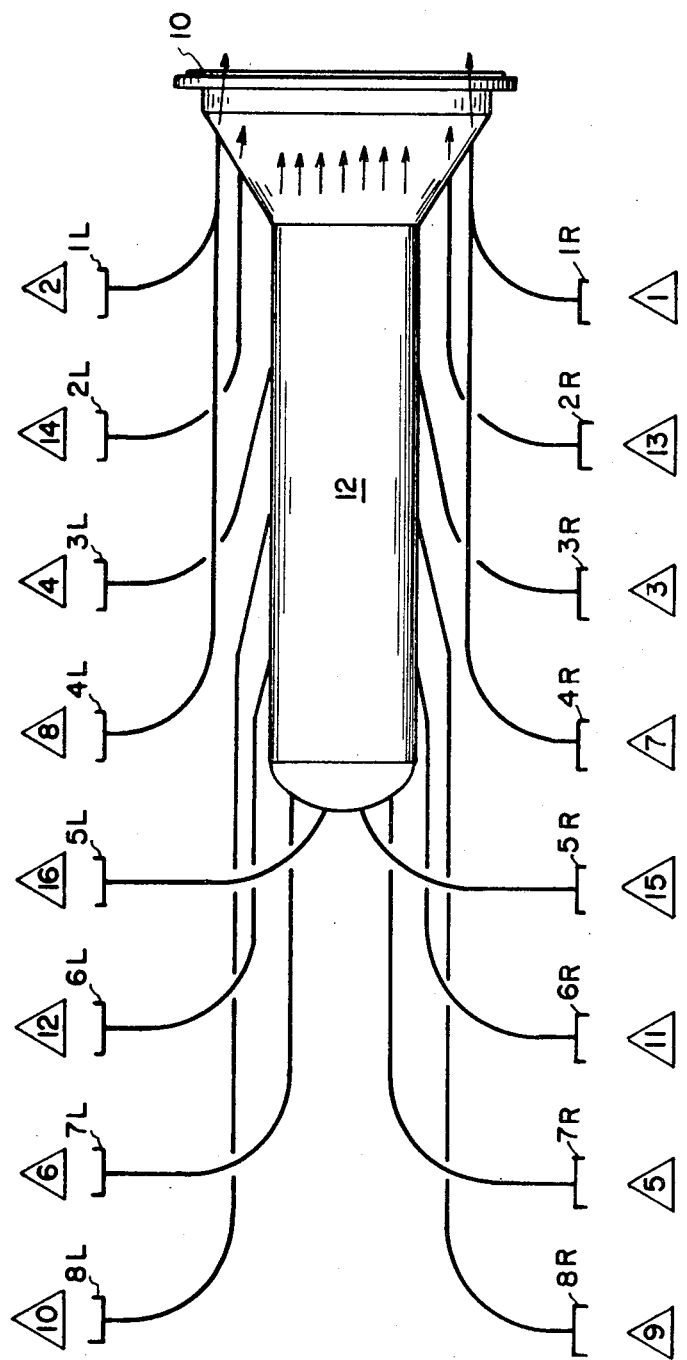
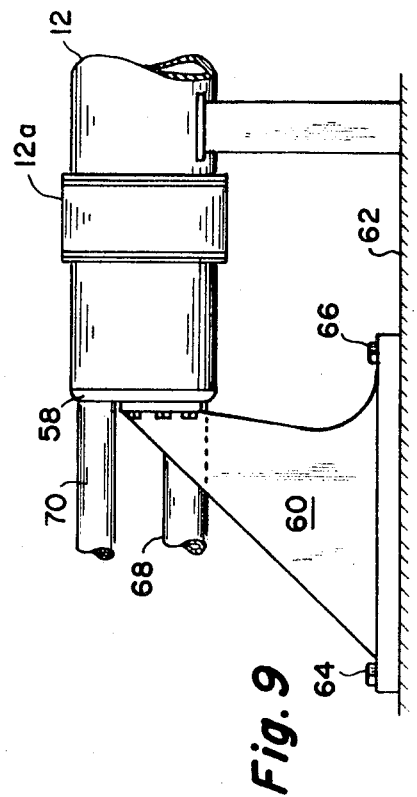
Fig.9
Fig.10

EXHAUST SYSTEM FOR A DIESEL ENGINE

This invention relates to an exhaust system and more particularly to an exhaust manifold for a diesel engine of the type employed in railroad locomotives. The manifold design of the present invention generally improves performance of the engine exhaust system, especially through higher engine operating efficiencies, and promotes longer engine and turbocharger life.

The present invention is an improvement over the two best known and most commonly used types of exhaust manifold systems, namely, the so-called "constant velocity system" and the "constant pressure system."

Briefly, the constant velocity system comprises a multipipe system, each pipe of which has a constant flow cross section extending from an engine exhaust port, with which the pipe communicates, to the discharge end of the manifold which may be connected to the inlet of a turbocharger. Usually, each pipe in this system is connected to a pair of exhaust ports; therefore, engine exhaust gas energy from one or more cylinders may be conveyed by each pipe assembly. Drawbacks of this system are the velocity head losses in the pipe. These result from gas friction on the pipe wall as well as gas passing through elbow bends. Another drawback is the direct impingement of all gas pulsations on the turbocharger, which shortens turbocharger life. On the positive side, the direct delivery of gases to the turbocharger gives the engine a greater response to changes at the engine input. This leads to greater efficiency and less waste of fuel during conditions of varying operation, such as acceleration.

The constant pressure system is essentially a pulse filtering system. The exhaust gases are passed into a main tube which serves as a plenum chamber. Depending on the pulse rate, pulse rise time, and size of the main tube, a particular filtering action will take place in the tube. This filtering action smoothes out the pressure pulses entering the tube and gives a gas flow output from the tube that is continuously smooth and free of incoming pulsations. But the constant pressure system is slow to respond to immediate engine inputs. This, in turn, creates a high inefficiency during a time when speeds are being varied. However, under conditions of constant operation, the system operates with satisfactory efficiency.

By integrating the two methods of delivering exhaust gases to a turbocharger, the best features of each system can be realized.

Our exhaust gas manifold comprises a number of pipes which directly connect the inlet of a turbocharger associated with the engine to a given number of engine cylinders less than all of the engine cylinders. For example, in the preferred embodiment, four or six cylinders of a 16 cylinder diesel engine are so connected. The majority of the cylinders discharge exhaust gas into a main pipe of the manifold which is connected at its discharge end to, and communicates with, the inlet of a turbocharger. The dimensions of the main pipe and the timing of the engine valves are so correlated that pressure fluctuations in the manifold are propagated internally. Specifically, the exhaust and intake valves are open when the fluctuating gas pressure within the main pipe is minimum, permitting scavenging of the engine at lower blower pressure. Each of the cylinders not directly connected by pipes to the turbocharger inlet is connected to the main pipe through a plurality of exhaust gas pipes having a constant cross section. The cylindrical main pipe has a large diameter relative to the diameter of the pipes which are connected directly to the turbocharger inlet. Our manifold is designed to take advantage of the firing sequence of the cylinders in scavenging the engine by discharging the exhaust gases into low pressure regions of the manifold.

A more complete understanding of our invention will be gained from the following description and the accompanying drawings wherein:

FIG. 1 is a plan view of one embodiment of our improved manifold for use with a 16 cylinder V-type diesel engine showing the manifold and its connection with the cylinder exhaust ports and a turbocharger inlet;

FIG. 2 is an elevation view of the manifold of FIG. 1;

Figure 6:
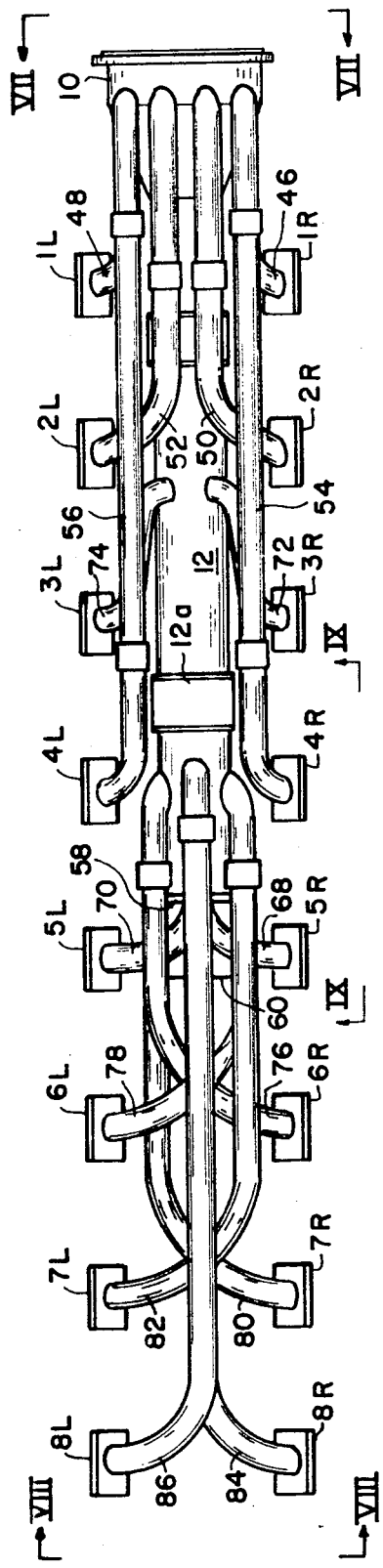
FIG. 6 is a plan view of a second embodiment of our invention.
Figure 7:
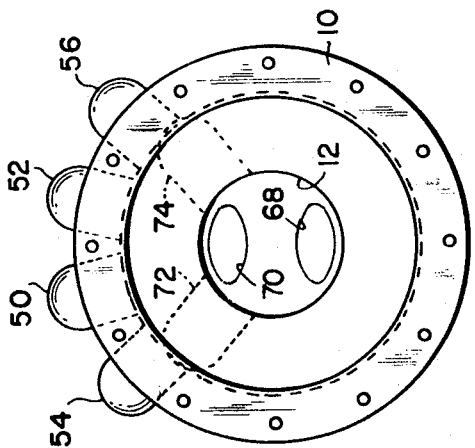
Figure 8:
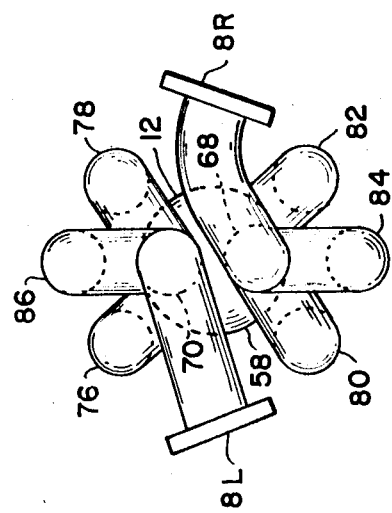

FIG. 7 is an end view (rotated 90° clockwise) on the lines VII—VII of FIG. 6 showing the manifold connnection with cylinders 1, 2, 3 and 4 only;

FIG. 8 is an end view (rotated 90° counterclockwise) on the lines VIII—VIII of FIG. 6 showing the manifold connection with the ports of cylinders 5, 6, 7 and 8 only;

FIG. 9 is a view taken along the lines IX—IX of FIG. 6 showing a part of the main pipe of the manifold and a means for supporting the manifold adjacent the engine; and FIG. 10 is a schematic view of our manifold showing its position relative to the engine exhaust ports and to a turbocharger inlet.

For convenience in referring to the drawings, the following convention has been adopted and is used throughout the description;

a. A cylinder is referred to by number and letter, i.e., 7R means the No. 7 cylinder on the righthand side of the engine looking toward the discharge end of the manifold.

b. The order of firing of a cylinder relative to all other cylinders is identified: in the description, by an underscored number, i.e., 5 means the fifth cylinder to fire in sequence; and in the drawings, in a triangle, i.e.,△.

c. A cylinder which is directly connected to the turbocharger inlet at the discharge end of the manifold is also underscored, i.e., 4L, the No. 4 cylinder on the left side of the engine is connected by substantially straight pipe to the turbocharger inlet.

Referring to FIGS. 1 and 2, our manifold is adapted for connection to an engine such as a 16 cylinder V-block engine (not shown) the ports of which connect to manifold flanges identifed by the attaching cylinder number, i.e., 1R, 1L, 2R, 2L, . . . 8R, 8L. A turbocharger inlet 10 is connected to one end of the manifold through a cylindrical main pipe 12 and cylinder pipes 14, 16 directly connected to cylinders 1R, 4R, 1L and 4L. The cylinder pipes, which are the same structure but in reversed position, each comprise a curved section *a*, a bellows member *b*, a relatively long straight section *c*, a tee section *d* which is connected to port 1R, or 1L, respectively, a second bellows member e, and a flanged section f which is connected to flange 18 of pipe 20 which opens into the flared mouth 22 of the turbocharger inlet 10.

The balance of the cylinders are indirectly connected to the turbocharger through the main pipe 12; that is, each of the cylinders other than 1R and 1L and 4R and 4L discharges its exhaust into the main pipe 12 which is secured at one end to the turbocharger inlet 10 and in direct communication with it. The drawings clearly show the structure and relative positions of the pipes which comprise our manifold. It will be noted that a number of the exhaust pipes are supported along the engine by a connection at one end to an exhaust port and a connection at the other end to a second gas pipe connected at its exhaust port to provide a relatively short beam length for the pipe.

Cylinder ports 2R, 3R and 2L, 3L exhaust into common pipes 24 and 26, respectively. The pipes 24 and 26 are connected into main pipe 12 near the turbocharger inlet. Bellows 28 and 30 are included in each of the pipes 24 and 26, respectively, to accommodate expansion and contraction of the sections upon change in temperature and pressure of the gases flowing therein.

Cylinders 5 - 8, inclusive, are connected to their respective exhaust ports and to the main pipe through pipes similar to pipes 24 and 26. Cylinder ports 5R and 8R are joined by pipe 32 to the main pipe 12 and cylinder ports 6R and 7R are connected to the main pipe by pipe 34. Bellows 36 and 38 are also provided in the pipes 32 and 34, respectively. An identical pipe structure on the opposite side of the manifold connects cylinder ports 5L, 6L, 7L and 8L to the main pipe 12.

The location of the opening of the pipes from the exhaust ports of cylinders 5, 6, 7 and 8 into the main pipe 12 is an important feature of our invention. When the firing order of the cylinders is considered, it is seen that cylinders nearest the turbocharger end of the main pipe, i.e., the lower-numbered cylinders, exhaust first, leaving a low pressure region therebehind. Cylinders later in the firing order, i.e., those having the higher numbers, then fire discharging the exhaust gases into the low pressure region of the manifold behind a high pressure pulse, resulting in more effective scavenging of the total system.

Figure 3:
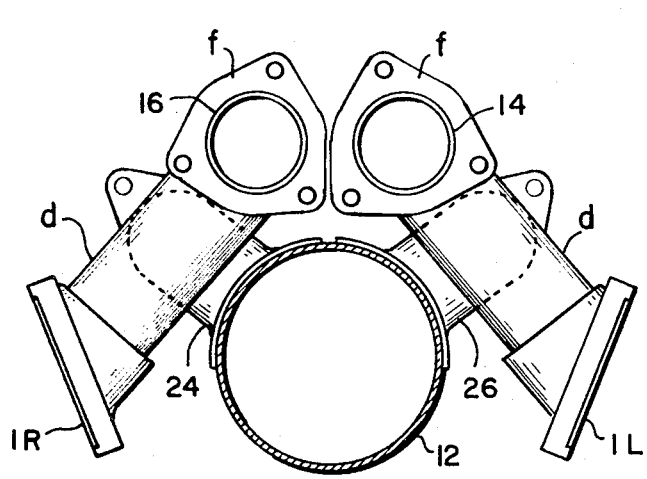
FIG. 3 is a view taken along the lines III—III of FIG. 2.
Figure 4:
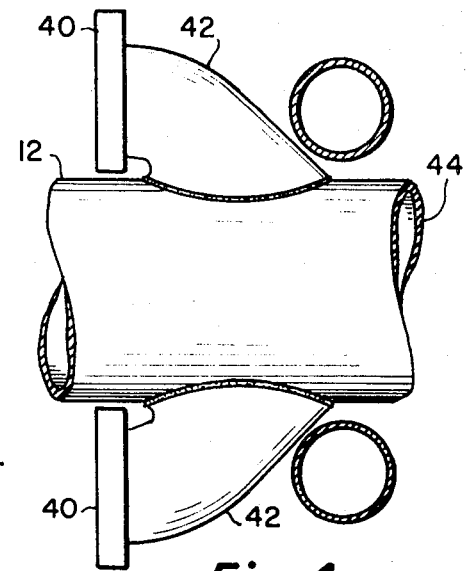
FIG. 4 shows a typical connection between the main pipe and a pipe from a cylinder.

Each of the pipes opening into the main pipe 12 is connected to it in the manner typically shown in FIG. 4. The pipes are connected to a flange 40 of an elbow 42 which is secured, as by welding, along the edge of an oval shaped opening into wall 44 of the main pipe 12. Each pipe is secured to two cylinder ports to carry the exhaust gases therefrom to the turbocharger and each of these ports also supports the main pipe 12. Each length of pipe includes at least one bellows which allows for expansion and contraction of the pipes and for relative change in position due to high pressure exhaust pulsing of gases into and through the manifold system.

Figure 5:
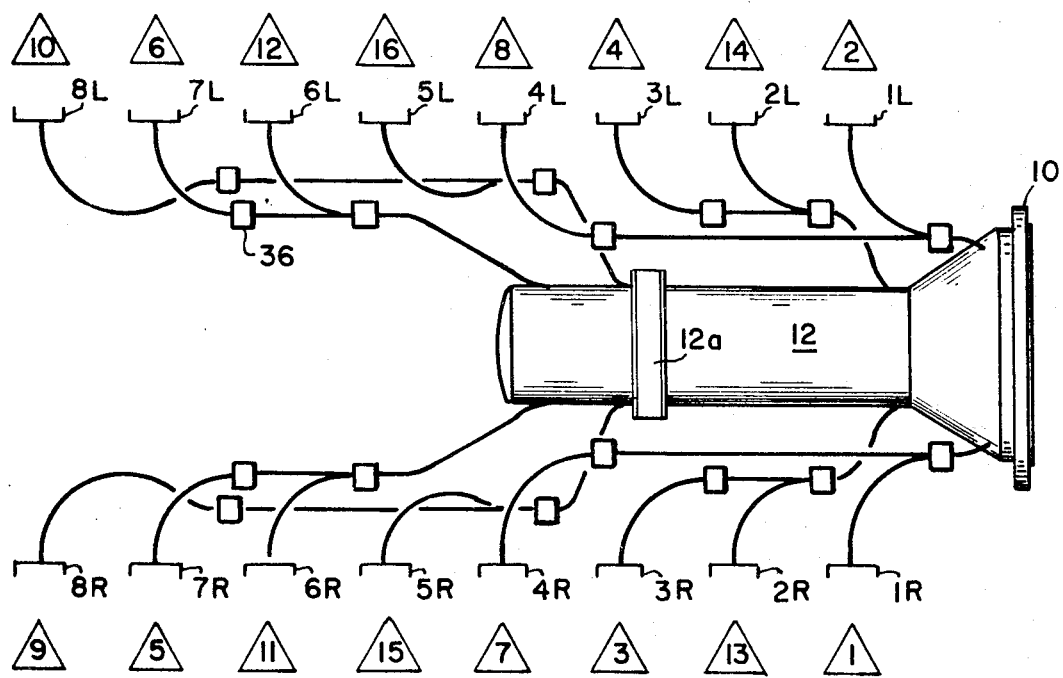
FIG. 5 is a schematic view of the manifold of FIGS. 1 – 4 and its connection with the turbocharger inlet.

The preferred embodiment of this invention provides the best features of a constant velocity manifold and a constant pressure manifold system. The schematic view of the system shown in FIG. 5 illustrates the relative locations of the elements of the system.

In a second embodiment of the invention, we have changed the relative positions of some of the elements of the manifold system, and also have reduced the number of exhaust ports connected to the pipes leading into the main pipe. As shown in FIG. 6 and using the same reference numerals for like elements previously disclosed, we have illustrated the cylinder exhaust ports of a typical 16 cylinder V-bank engine (not shown). A pipe is connected to each exhaust port and extends parallel to the rows of cylinders along the engine. A number of such pipes are directly connected to an inlet 10 of a turbocharger (not shown) at their discharge ends, that is, the end opposite the exhaust ports to which they are connected.

Beginning at the discharge end of the manifold in FIG. 6, we have shown pipes 46 and 48 connected to the exhaust ports of cylinders 1R and 1L, respectively; pipes 50 and 52 connected to ports of 2R and 2L, respectively; and pipes 54 and 56 connected to ports 4R and 4L, respectively. Pipe 54 discharges through a portion of pipe 46 into the inlet 10 and pipe 56 discharges through a portion of pipe 48. Each pipe 46, 48, 50, 52, 54 and 56 is of constant cross section and connects the cylinder exhaust port to which it is connected directly with the inlet of the turbocharger 10.

A cylindrical main pipe 12 having a bellows 12a is connected at its discharge end to communicate with the turbocharger inlet and extends along the engine substantially parallel to the two rows of exhaust ports to a point adjacent the exhaust ports of cylinder 4. The main pipe is closed at an end 58 opposite its discharge end and is supported (FIG. 9) by parallel vertically oriented gusset plates 60 having right angle flanges which are secured to end 58 and to the top of an engine block 62 (shown in schematic), as by bolts 64 and 66.

Short pipes 68 and 70 open into the end 58 and connect cylinder ports 5R and 5L, respectively, to the main pipe 12. Pipes 72 and 74 open into the main pipe and connect it to cylinder ports 3R and 3L, respectively. Similarly, pipes 76 and 78, pipes 80 and 82, and pipes 84 and 86 connect cylinder ports 6R and 6L, 7R and 7L, 8R and 8L, respectively, to the main pipe 12. Each pipe 68 - 86, inclusive, is of constant cross section and connects its cylinder exhaust port to the main pipe 12 which discharges into the turbocharger inlet. Hence, each cylinder port 3R, 3L, 5R, 5L, 6R, 6L, 7R, 7L, and 8R, 8L is indirectly connected to the inlet 10.

A consideration of the manifold geometry shown in FIG. 6 of the drawings indicates that six of the 16 cylinder exhaust ports are directly connected to the inlet of the turbocharger. Accordingly, approximately 37.5 percent of the total exhaust energy is delivered directly to the turbocharger inlet assembly. The significance of this amount of energy is that positive acceleration under load is achieved.

Pertinent data has been set forth, in the Table, on a preferred manifold design for a turbocharged 16 cylinder, four cycle locomotive engine having a power rating of 2,500 brake horse power at 1,000 RPM; a displacement of 9.0 bore by 10.5 stroke; and an engine firing order 1R, 1L, 3R, 3L, 7R, 7L, 4R, 4L, 8R, 8L, 6R, 6L, 2R, 2L, 5R, 5L. A gas flow analysis was predicated on these rated engine power conditions. The exhaust gas temperature value used was 1,200°F and the mean exhaust gas pressure was 44.7 psia. The engine displacement was calculated to be 6.19 cubic feet. Using a turbocharger having a 3:1 pressure ratio, the intake volume was 9,270 SCFM of air. Exhaust gas weight flow was caluclated to be 41,700 lbs./hr.

The following tabe correlates the cylinder number with the numerical sequence of firing, which in turn assures the desired and timed internal pressure fluctuations.

TABLE

| Firing Order | Cylinder Number | Distance from Engine Cylinder To Main Pipe Inlet (In./Ft.) | Time Cylinder will Discharge from Time "Zero" (5L Disch. at time "Zero" (Sec.) | Time for Charge to pass into main pipe (Sec.) | Elapsed time when charge will have passed into main pipe from time "Zero" (Sec.) |
|---|---|---|---|---|---|
| 1. | 1 R* | 16/1.33 | .0075 | .0044 | .0119 |
| 2. | 1 L* | 16/1.33 | .0150 | .0044 | .0194 |
| 3. | 3 R | 32/2.66 | .0225 | .0087 | .0312 |
| 4. | 3 L | 32/2.66 | .0300 | .0087 | .0387 |
| 5. | 7 R | 32/2.66 | .0375 | .0087 | .0462 |
| 6. | 7 L | 32/2.66 | .0450 | .0087 | .0537 |
| 7. | 4 R* | 66/5.5 | .0525 | .0180 | .0705 |
| 8. | 4 L* | 66/5.5 | .0600 | .0180 | .0780 |
| 9. | 8 R | 66/5.5 | .0675 | .0180 | .0855 |
| 10. | 8 L | 66/5.5 | .0750 | .0810 | .0930 |
| 11. | 6 R | 15/1.25 | .0825 | .0041 | .0866 |
| 12. | 6 L | 15/1.25 | .0900 | .0041 | .0941 |
| 13. | 2 R | 15/1.25 | .0975 | .0041 | .1016 |
| 14. | 2 L | 15/1.25 | .1050 | .0041 | .1091 |
| 15. | 5 R | 16/1.33 | .1125 | .0044 | .1169 |
| 16. | 5 L | 16/1.33 | .1200 | .0044 | .1244 |
| 1. | | | .1275 | .0044 | .1319 |

*Exhaust Delivery Directly to Turbocharger 290-315 Ft./Sec. Avg. Manifold Pipe Gas Velocity.

It will be appreciated from the data set forth in the Table that the non-interference, with each other, of every cylinder exhaust pulse; i.e., the balancing of exhaust energy to drive the turbocharger results in improved engine performance. Specifically, greater engine acceleration power boost can be achieved through the balance of the exhaust energy delivered to the turbocharger and an increase in the life of the turbocharger through a narrower band of exhaust temperature and pressure fluctuations. Lower cylinder head temperatures result through improved breathing of the engine. Effective scavenging of the engine is promoted by the timed pressure fluctuations through the exhaust manifold. In addition, lower blower pressures can be experienced with improvement in the engine scavenging. Finally, engine fuel consumption is improved, and cleaner exhaust emission achieved through more effective exhaust energy use.

A further example of the improved exhaust system for a diesel engine follows:

To insure adequate exhaust gas velocities for improved turbocharger efficiency, the size of the main pipe and gas delivery pipes were selected such that the average velocity range was from 290–315 ft./sec. Assuming a steady state gas flow and neglecting velocity pressure head loss since the design was predicated on a substantially straight gas flow, tight bends and abrupt cross sectional area changes being avoided, a preferred main pipe bore for receiving exhaust gas from cylinders 3R and 3L, 5R and 5L, 6R and 6L, 7R and 7L, and 8R and 8L was approximately 7 inches I.D. The bore of the tubes interconnecting cylinders 1 and 4 were selected to be 3.07 inches I.D. These dimensions insured that pressure fluctuations within the pipe were propagated internally and did not interfere with discharge of the gases through the manifold to the inlet of the turbocharger. Moreover, by properly controlling the propagation of the fluctuations of the exhaust gas passing through the turbocharger a more effective scavenging system is achieved.

Having described in detail certain embodiments of our invention, it should be understood that the invention may otherwise be included in the scope of the appended claims.

We claim:

1. In a diesel engine having a plurality of engine exhaust ports, an exhaust gas manifold adapted to be connected to an inlet of a turbocharger for the engine comprising:
   A. a main pipe adapted at one end for connection to the inlet of a turbocharger and closed at the opposite end;
   B. a plurality of exhaust gas pipes of constant cross section less than the cross section of the main pipe, each of the pipes being connected to an exhaust port of the engine and adapted for direct connection to the inlet of the turbocharger;
   C. a plurality of pipes having a cross section less than the cross section of the main pipe, each of said pipes being connected to an exhaust port of the engine and to the main pipe; and
   D. the total number of pipes adapted for direct connection to the inlet of the supercharger being less than the total number of pipes connected between the engine cylinder ports and the main pipe.

2. An exhaust gas manifold as set forth in claim 1 in which each of the exhaust gas pipes include, at a position along its length, at least one bellows member.

3. An exhaust gas manifold as set forth in claim 1 in which a number of the exhaust gas pipes are supported along the engine by a connection at one end to an exhaust port and a connection at the other end to a second gas pipe connected to its exhaust port to provide a relatively short beam length for such pipe.

4. An exhaust manifold for a turbocharged diesel engine comprising:
   A. a main pipe for connection at one end to an inlet of a turbocharger and closed at its opposite end;
   B. a plurality of high gas velocity constant cross section pipes for direct connection to cylinder ports of an engine and to the inlet of the turbocharger;
   C. a second plurality of constant cross section pipes for connection to the balance of the cylinder ports at one end and to the main pipe at the other;
   D. the number of pipes for direct connection between cylinder ports and the turbocharger inlet being less than the number of pipes for connection between the balance of the cylinder ports and the cylindrical main pipe.

5. An exhaust manifold as set forth in claim 4 in which the main pipe has its longitudinal axis for alignment with the inlet of the turbocharger and each of the pipes for direct connection between the ports of the engine and the turbocharger has its axis parallel to the axis of the main pipe.

6. An exhaust gas manifold as set forth in claim 4 in which the end of the main pipe opposite that to be connected to the turbocharger inlet is supported by means for connection between said opposite end and a block of an engine.

7. An exhaust manifold as set forth in claim 4 in which bellows are positioned in each of said exhaust carrying pipes for connection to exhaust ports.

8. An exhaust manifold as set forth in claim 4 in which the pipes for direct connection between cylinder ports and the turbocharger inlet carry less than 50 percent of the exhaust gases from the engine.

* * * * *

UNITED STATES PATENT OFFICE
CERTIFICATE OF CORRECTION

Patent No. 3,748,850                  Dated July 31, 1973

Inventor(s) Edmund H. vonHoevel; Robert A. Bolte

It is certified that error appears in the above-identified patent and that said Letters Patent are hereby corrected as shown below:

Column 2, line 53 "4L" should read --$\underline{4L}$--;
        line 60 "1R, 1L" should read --$\underline{1R}$, $\underline{1L}$--;
        line 63 "1R, 4R, 1L" should read --$\underline{1R}$, $\underline{4R}$, $\underline{1L}$--;
        line 64 "4L" should read --$\underline{4L}$--.
Column 3, line 1 "1L" should read --$\underline{1L}$--;
        line 7 "1R and 1L and 4R" should read --$\underline{1R}$ and $\underline{1L}$ and $\underline{4R}$--;
        line 8 "4L" should read --$\underline{4L}$--.
Column 4, line 13 "1R and 1L" should read --$\underline{1R}$ and $\underline{1L}$--;
        line 14 "2R and 2L" should read --$\underline{2R}$ and $\underline{2L}$--;
        line 15 "4R" should read --$\underline{4R}$--;
        line 16 "4L" should read --$\underline{4L}$--;
        line 26 "4" should read --$\underline{4}$--;
        line 57 "1R, 1L" should read --$\underline{1R}$, $\underline{1L}$--;
        line 57 "4R, 4L" should read --$\underline{4R}$, $\underline{4L}$--;
        line 58, "2R, 2L" should read --$\underline{2R}$, $\underline{2L}$--;
        line 67 "tabe" should read --table--.
Column 5, line 67 "1 and 4" should read --$\underline{1}$ and $\underline{4}$--.

Signed and sealed this 20th day of November 1973.

(SEAL)
Attest:

EDWARD M. FLETCHER, JR.              RENE D. TEGTMEYER
Attesting Officer                    Acting Commissioner of Patents